United States Patent
Lenti et al.

(12) 
(10) Patent No.: US 6,197,866 B1
(45) Date of Patent: Mar. 6, 2001

(54) AQUEOUS PAINTING COMPOSITION COMPRISING A PARTIALLY FLUORINATED NON IONIC POLYMERIC COMPOUND AS A THICKENING ADDITIVE

(75) Inventors: Daria Lenti, Valenza; Tiziana Poggio, Montechiaro, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/318,656

(22) Filed: May 25, 1999

(30) Foreign Application Priority Data

Jul. 27, 1998 (IT) ................................. MI98A1736

(51) Int. Cl.⁷ ................. C08J 3/00; C08K 5/36; C08K 5/48; C08K 5/06; C08L 91/06
(52) U.S. Cl. ............... 524/462; 524/244; 524/278; 524/282; 524/366; 524/463; 524/520; 524/544; 524/545; 524/546
(58) Field of Search ................... 524/244, 278, 524/282, 366, 462, 463, 520, 544, 545, 546

(56) References Cited

U.S. PATENT DOCUMENTS

| 4,514,537 | 4/1985 | Cavanaugh . |
| 5,532,310 | 7/1996 | Grenfell et al. . |

FOREIGN PATENT DOCUMENTS

| 0337311 | 10/1989 | (EP) . |
| 0374803 | 7/1996 | (EP) . |
| 0818489 | 1/1998 | (EP) . |

OTHER PUBLICATIONS

European Search Report, The Hague, Nov. 9, 1999, Examiner De Los Arcos, E.

European Search Report, Jan. 13, 1999, Examiner De Los Arcos, E.

Primary Examiner—Patrick D. Niland
(74) Attorney, Agent, or Firm—Hedman & Costigan, P.C.

(57) ABSTRACT

Painting composition based on fluoropolymers in an aqueous dispersion, comprising a partially fluorinated non ionic polymeric compound as an additive for the control of the viscosity and in general of the rheological characteristics of the composition itself.

16 Claims, No Drawings

AQUEOUS PAINTING COMPOSITION COMPRISING A PARTIALLY FLUORINATED NON IONIC POLYMERIC COMPOUND AS A THICKENING ADDITIVE

The present application claims priority to Italian Application Serial No. MI98A001736.

FIELD OF THE INVENTION

Painting composition based on fluoropolymers in an aqueous dispersion, comprising a partially fluorinated non ionic polymeric compound as an additive for the control of the viscosity and in general of the rheological characteristics of the composition itself.

PRIOR ART

It is known that every paint must have specific characteristics as a function of the application conditions, in order to guarantee the necessary final characteristics of the coating such as for example a minimum thickness vertically applicable, flow, superficial appearance and so on.

Therefore a fundamental characteristic of the paint is its "rheological profile" that is its viscous behaviour as a function of the slipping gradient to which it is submitted.

The rheology control as a function of the optimal profile for each specific application, may be obtained by different classes of inorganic (clays, bentonites, pyrogenic silica) or organic (acrylic, cellulosic, urethanic polymers) additives, used individually or in combination among them. The use of these additives takes on particular importance in the formulation of the systems in an aqueous emulsion, for which the control of the viscosity results more critical than in the case of solvent paints and in the majority of the cases the suitable rheological profile is obtained associating 2–4 additives having different characteristics. Each of these classes of additives shows however some limits and disadvantages.

The cellulose ethers cause in water viscous solutions of hydrated macromolecular aggregates not having an associative action but more simply increase the water viscosity. The behaviour of these products is clearly pseudo-plastic with very high viscosity at low gradient which is drastically reduced when this one increases and it comes back quickly to its original state as soon as the action of shear is interrupted. The obtained paint shows a good brushability while properties such as flow and antisplash are not optimal, negatively affecting properties such as the applicable thickness and the brightness, particularly in the case of spray or roll application.

The additives of acrylic kind are acid copolymers reinflatable with alkali and show, with respect to the cellulosic ethers, a greater Newtonian character (lower sensibility with respect to the applied gradient), resulting in better characteristics of the paint, in particular greater applicable thicknesses, better flow and quality of the film. As however the associative mechanism to which this behaviour is due depends on the presence in the polymeric chain of acid sites having salified form, the use of these additives is limited to paints having pH 8–10.

The polyether-polyurethane block polymers form the more recent innovation in the field of rheologic additives for emulsion paints. The associative action mechanism of these systems is linked to the different solubility in water of the portions of the chain PU and PE. They associate a behaviour more clearly Newtonian than the acrylic copolymers one and a substantial independence of the rheological characteristics from the pH of the paint.

The use of the polyurethanic additives is described for example in the U.S. Pat. Nos. 4,079,028 and 4,155,892.

Usually the inorganic additives show a behaviour more resistant against chemical agents vehiculated by the water (acids, bases, salts) but they need to be incorporated with a high shear and they give poorly reproducible results.

The most frequently used organic additives are hydrophilic polar polymers and they transfer these properties to the coatings obtained by the formulations containing them. In fact these coatings show a greater affinity for the water which represents the principal vehicle of the aggressive agents. This aspect is particularly important in the case of paints for application in aggressive environment where a high chemical resistance is required.

SUMMARY

We have found that using a partially fluorinated non ionic polymeric compound as thickening additive in aqueous painting compositions based on fluoropolymers, an improvement of the rheological behaviour of the compositions is obtained without affecting the coating hydrophilia. Said partially fluorinated non ionic polymeric compound has the following general formula (I):

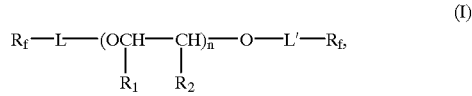

wherein
n is a number ranging from 4 to 60 and preferably ranging from 8 to 30; L and L', equal or different between them, are selected from:

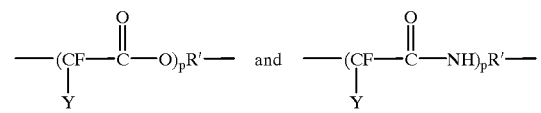

wherein
p is 0 or 1, Y is F or $CF_3$ and R' is an alkyl radical $C_1$–$C_5$;
$R_1$ and $R_2$ are both H or one is H and the other one is $CH_3$;
$R_f$ and $R_{f'}$, equal or different between them, are perfluoropolyether radicals having a numerical average molecular weight ranging from 250 to 1500 and preferably ranging from 400 to 1000.

DETAILED DESCRIPTION OF THE INVENTION

The characteristics and the advantages of the use of an additive consisting of a partially fluorinated non ionic polymeric compound in aqueous painting compositions based on fluoropolymers, will be mostly pointed out during the following detailed description.

Said polymeric compound has the following general formula (I)

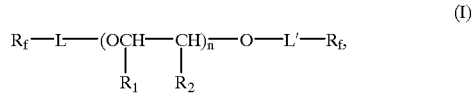

wherein:
   n is a number ranging from 4 to 60 and preferably ranging from 8 to 30; L and L', equal or different between them, are selected from:

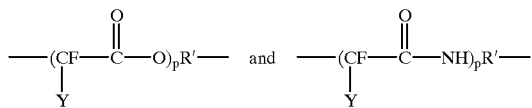

wherein
   p is 0 or 1, Y is F or $CF_3$ and R' is an alkyl radical $C_1$–$C_5$;
   $R_1$ and $R_2$ are both H or one is H and the other one is $CH_3$;
   $R_f$ and $R_{f'}$, equal or different between them, are perfluoropolyether radicals having a numerical average molecular weight ranging from 250 to 1500 and preferably ranging from 400 to 1000.

The perfluoropolyether radicals $R_f$ and $R_f'$ comprise a T terminal and repetitive units statistically distributed along the polymer chain selected from:

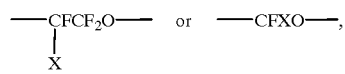

wherein X is F or —$CF_3$,
   —$CF_2(CF_2)_zO$— wherein z is a number equal to 2 or 3;
   —$CF_2CF(OR_{f'})O$— or —$CF(OR_{f'})O$— wherein $R_{f'}$ is —$CF_3$, —$C_2F_5$ or —$C_3F_7$.

The T terminal of the perfluoropolyether radical is selected from: —$CF_3$, —$C_2F_5$, $C_3F_7$, $ClCF_2CF(CF_3)$—, $CF_3CFClCF_2$—, $ClCF_2CF_2$— and $ClCF_2$—.

In particular the following perfluoropolyether radicals $R_f$ and $R_{f'}$ may be cited as preferred:

(a) T—O $(CF_2CF(CF_3)O)_a(CFXO)_b$—
wherein: X is F or $CF_3$, a and b are numbers such that the molecular weight is ranging in the above shown range, the ratio a/b is ranging from 10 to 100 and T is one of the above cited terminals;

(b) T—$O(CF_2CF_2O)_c(CF_2O)_d(CF_2(CF_2)_zCF_2O)_h$—
wherein: c, d and h are numbers such that the molecular weight is ranging in the above shown range, the ratio c/d is ranging from 0.1 to 10, the ratio h/(c+d) is ranging from 0 to 0.05, z is a number equal to 2 or 3, and T is one of the above cited terminals;

(c) T—$O(CF_2CF(CF_3)O)_e(CF_2CF_2O)_f(CFXO)_g$—
wherein: X is F or $CF_3$; e, f, g are numbers such that the molecular weight is ranging in the above shown range; the ratio e/(f+g) is ranging from 0.1 to 10, the ratio f/g is ranging from 2 to 10 and T is one of the above cited terminals;

(d) T—$O(CF_2O)_j(CF_2CF(OR_{f'})O)_k(CF(OR_{f'})O)_l$—
wherein: $R_{f'}$ is —$CF_3$, —$C_2F_5$, —$C_3F_7$; j, k, l are numbers such that the molecular weight is ranging in the above shown range; k+l and j+k+l are at least equal to 2, the ratio k/(j+l) is ranging from 0.01 to 1000, the ratio l/j is ranging from 0.01 to 100 and T is one of the above cited terminals;

(e) T—O—$(CF_2(CF_2)_zCF_2O)_s$—
wherein s is such a number to give the above shown molecular weight, z has the above defined meaning and T is one of the above cited terminals;

(f) T—$O(CR_4R_5CF_2CF_2O)_{j'}$—
wherein R4 and R5 are equal or different between them and selected from H, Cl or perfluoroalkyl having for example 1–4 C atoms, j' is such a number to give the above indicated molecular weight;

(g) T—$O(CF(CF_3)CF_2O)_{j''}$—
wherein j" is such a number to give the above indicated molecular weight.

These compounds and the methods for their preparation are described in several Patents such as for example in GB 1.104.482, U.S. Pat. No. 3,242,218 and U.S. Pat. No. 3,665,041.

The perfluoropolyether radicals particularly preferred of the present invention have the following structures:
   $R_{f''}$—O—$(CF(CF_3)CF_2O)_a(CF_2O)_b$ and
   $ClC_3F_6O(CF(CF_3)CF_2O)_a(CF_2O)_b$
wherein a and b are numbers such that the molecular weight is ranging in the above defined range, the ratio a/b is ranging from about 20 to about 40, and $R_{f''}$ has the above defined meaning.

The painting compositions according to the present invention are comprised essentially of latexes of fluoropolymers suitably formulated as a function of the final use according to the known techniques. Preferably said fluoropolymers belong to the fluoroelastomer class. The known fluoroelastomers such as Tecnoflon® are the ones preferably used in the composition of the formulations of the present invention. Such fluoroelastomers are comprised of copolymers of the vinylidene fluoride and of the hexafluoropropene and if necessary by one or more comonomers, used in order to give particular properties to the elastomer. These comonomers may be the tetrafluoroethylene, the perfluoro (alkylvinylethers), the 1-hydropentafluoroethylene, the chlorotrifluoroethylene and the olefins having to 4 carbon atoms.

The mainly preferred fluoroelastomers are the terpolymers consisting of vinylidene fluoride, hexafluoropropene and tetrafluoroethylene and the terpolymers consisting of vinylidene fluoride, hexafluoropropene and perfluoro (methylvinylether).

The fluoroelastomer used in the compositions has the form of an aqueous dispersion of colloidal particles having submicronic size. The dispersion has a high concentration of fluoroelastomer which is obtained, according to the known techniques, from a dispersion coming directly from the polymerization process by the addition of a non ionic surfactant, the warming to the clouding temperature and its maintenance at this temperature for the time needed for the separation of a concentrated phase having a polymer concentration ranging from 55 to 70% by weight and a surfactant content equal to 3–4% by weight.

The so obtained latex is then suitably formulated, always according to the known techniques, as a function of the paint application, with different substances such as pigments, dispersants, anti-foam products and so on, in a total amount ranging from 20 to 40% and preferably from 25 to 35% by weight with respect to the fluoroelastomer. The obtained formulation is milled using the known techniques to obtain a milling Hegman degree higher than 7.

The additive having formula (I) is added after the milling in an amount ranging from 0.02 to 0.3% by weight with respect to the formulation, as a function of the desired viscosity increase, keeping the suspension under mild stirring at room temperature. The additive may be added as it is or in the form of an aqueous solution having a concentration ranging from 20 to 90% by weight.

In a series of experimental tests the effect of the additives of the present invention in comparison with the additives of the known technique has been studied, in fluoroelastomer based aqueous painting compositions.

The efficacy of the additives has been evaluated in terms of maximum thickness vertically applicable per single passage (limit thickness of run) and the hydrophilia increase by the water absorption has been measured (immersion in water at 60° C. of the cross-linked film).

In the instance of additives of the known technique a weight increase, due to the absorption of water, double with respect to the non additived film has been found. In the instance of the additive according to the invention any variation in the film behaviour has not been found.

This unexpected characteristic of the painting compositions according to the present invention has a great interest because it allows the intrinsic properties maintenance of the formulations and then the achievement of coatings having a high resistance to the absorption of water and to chemical aggression. Then the obtained paints turn out to be particularly important for the application in critical sectors such as for example containment areas and collectors for dangerous or aggressive fluids.

For illustrative aim the following experimental Examples are reported.

EXAMPLE 1

A 65% by weight fluoroelastomer latex in water (Fluorobase T300®, comprised of terpolymer of vinylidene fluoride/hexafluoropropene/tetrafluoroethylene having a molar ratio among the monomeric units 65/19/16, and containing 5% by weight on the terpolymer of polytetrafluoroethylene) is formulated as reported in Table 1 wherein three compositions of the different components expressed by weight percentage of the formulation are reported. The painting compositions are obtained by milling in a microsphere Fryma Maschinen AG Mod. MSM 12 mill. The milling is carried out continuously for a residence time equal to 30–200 seconds in the milling room, using little soapstone spheres having a diameter equal to 1–1.5 mm as milling elements, with a 50% by volume filling of the milling room. The compositions are submitted to two passages in the mill in order to obtain the desired milling degree of the pigment (Hegman milling degree>7). The viscosity of the obtained compositions is evaluated by the measure of the outflow time in the Coppa Ford 4.

TABLE 1

| Dispersion of | Composition 1 | Composition 2 | Composition 3 |
|---|---|---|---|
| Fluorobase T300 ® | 84.8 | 85.7 | 84.1 |
| 10% Hexametha phosphate | — | — | 0.8 |
| Kaolin | 7.5 | 7.6 | 7.4 |
| Zinc Oxide | 4 | 4 | 4 |

TABLE 1-continued

| Dispersion of | Composition 1 | Composition 2 | Composition 3 |
|---|---|---|---|
| Carbon Black | 1.5 | 1.5 | 1.5 |
| Pyrogenic Silica | 0.5 | — | 0.5 |
| Attapulgite | 0.5 | — | 0.5 |
| Anti-Foam | 1.2 | 1.2 | 1.2 |
| Coppa Ford 4 (sec.) | 80 | 30 | 60 |

EXAMPLE 2

The compositions obtained as described in the Example 1 are used as a base in a cross-linkable bicomponent paint at room temperature using 1,4 bis-3-aminopropylpiperazine as cross-linking agent in an amount equal to 1% by weight, obtaining respectively the compositions 1a, 2a and 3a.

The compositions 1a, 2a and 3a are applied by air spray, vertically, on crude aluminum plates degreased by washing with toluene and acetone.

The maximum applicable thickness of the paint is evaluated after 48 hours of drying at room temperature measuring the cross-linked film thickness and verifying the absence of run. In this way the run limit, that is the vertically applicable maximum thickness on aluminum is determined.

The film is detached from the support after 15 days of cross-linking at room temperature and it is used for the determination of the water absorption (immersion in demineralized water at 60° C., for 15 days, and evaluation of the weight variation). A part of the film itself is used for the determination of the cross-linking degree by swelling measures in a solvent, measuring the ratio by volume between the swelled film and the dried film after the extraction of the soluble fraction (values of such a ratio ranging from 3 to 4 are a valid criterion of cross-linking control). The compositions of the Example 2 have been submitted to the described tests and the results are reported in Table 2.

TABLE 2

|  | Composition 1a | Composition 2a | Composition 3a |
|---|---|---|---|
| Cross-linking Degree | 4 | 4 | 4 |
| Run Limit ($\mu$m) | 100 | 50 | 140 |
| Water Absorption (%) (after 15 days) | 1.5 | 1.5 | 1.35 |

EXAMPLE 3

To two samples of the composition 1a are respectively added 0.02 and 0.04 % by weight of an additive according to the present invention having the following formula:

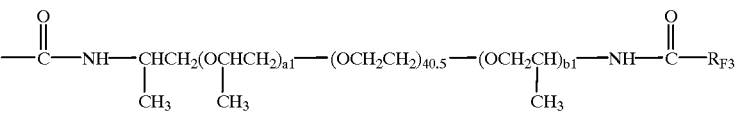

wherein:

a1+b1=2.5;

$R_{F3}$ is $Cl(C_3F_6O)_nCF_2$ and n=2 or 3, obtaining the compositions 1a with additive.

The additive has been added in the form of a 10% aqueous solution under mild stirring.

Then the samples have been left in equilibrium for about 4 hours before the application.

The application and the evaluations have been carried out as described in the Example 2.

The results are reported in Table 3.

EXAMPLE 4

The Example 3 has been repeated with the difference that the composition 2a has been used and that 0.06; 0.08 and 0.12% by weight of additive have been respectively added to three samples of this composition, obtaining the compositions 2a with additive.

The results are reported in Table 3.

EXAMPLE 5 (COMPARISON)

The Example 3 has been repeated with the difference that a hydrogenated polyurethanic additive has been used according to the known technique (Nopco®-Henkel) added to the composition 1a in an amount equal to 0.2% by weight, instead of the additive according to the present invention.

The results are reported in Table 3.

EXAMPLE 6 (COMPARISON)

The Example 3 has been repeated with the difference that a hydrogenated polyurethanic additive has been used according to the known technique (Rheolate 420®-Rheox) added to the composition 1a in an amount equal to 0.1% by weight, instead of the additive according to the present invention.

The results are reported in Table 3.

EXAMPLE 7 (COMPARISON)

The Example 3 has been repeated with the difference that a hydrogenated polyurethanic additive has been used according to the known technique (Rheolate 420®-Rheox) added to the composition 2a in an amount equal to 0.04% by weight, instead of the additive according to the present invention.

The results are reported in Table 3.

EXAMPLE 8 (COMPARISON)

The Example 3 has been repeated with the difference that a hydrogenated polyurethanic additive has been used according to the known technique (Rheox®-ChemPlast) added to the composition 1a in an amount equal to 0.1% by weight, instead of the additive according to the present invention.

The results are reported in Table 3.

EXAMPLE 9

The same additive of the Example 3 has been added to the composition 3a in amounts equal to 0.02; 0.04; 0.06 and 0.08% by weight, following the same conditions.

The application and the evaluations have been carried out as it is described in the Example 2.

The results are reported in Table 3.

TABLE 3

| Additive % | Comp. 1a Run Limit ($\mu$m) | Comp. 1a Water Absorp. % | Comp. 2a Run Limit ($\mu$m) | Comp. 2a Water Absorp. % | Comp. 3a Run Limit ($\mu$m) | Comp. 3a Water Absorp. % |
|---|---|---|---|---|---|---|
| None | 100 | 1.5 | 50 | 1.5 | 140 | 1.35 |
| Ex. 3-0.02% | 120–130 | 1.5 | | | | |
| Ex. 3-0.04% | 170–180 | 1.5 | | | | |
| Ex. 4-0.06% | | | 80 | 0.45 | | |
| Ex. 4-0.08% | | | 100 | 0.45 | | |
| Ex. 4-0.12% | | | 160 | 1.6 | | |
| Ex. 5 Nopco-0.2% | 190 | 4.5 | | | | |
| Ex. 6 Rheolate 420-0.1% | 200 | 4 | | | | |
| Ex. 7 Rheolate 420-0.04% | | | 200 | 4.9 | | |
| Ex. 8-Rheox-0.1% | 200 | 4 | | | | |
| Ex. 9-0.02% | | | | | 160 | 0.24 |
| Ex. 9-0.04% | | | | | 150 | 0.15 |
| Ex. 9-0.06% | | | | | 150 | 0.2 |
| Ex. 9-0.08% | | | | | 200 | 0.35 |

What is claimed is:

1. Aqueous painting composition containing from 55 to 70% by weight of fluoropolymers belonging to the fluoroelastomers class, wherein said composition comprises a partially fluorinated non ionic polymeric compound as a thickening additive having the following general formula (I)

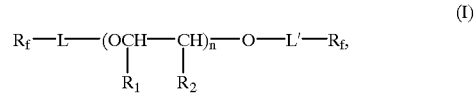

in which
n is a number ranging from 4 to 60; L and L' are equal or different and are selected from:

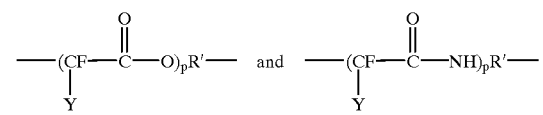

in which
P is 0 or 1, Y is F or $CF_3$ and R' is an alkyl radical $C_1$–$C_5$;
$R_1$ and $R_2$ are both H or one is H and the other of $R_1$ and $R_2$ is $CH_3$;
$R_f$ and $R_{f'}$ are equal or different and are perfluoropolyether radicals having a number average molecular weight ranging from 250 to 1500 and they comprise a T terminal and repetitive units statistically distributed along the polymer chain selected from:

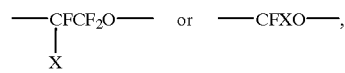

wherein X is F or —$CF_3$;
—$CF_2(CF_2)_zO$ wherein z is a number equal to 2 or 3;
—$CF_2CF(OR_f)O$— or —$CF(OR_f)O$— wherein $R_f$ is —$CF_3$, —$C_2F_5$ or —$C_3F_7$, said T terminal being selected from: —$CF_3$, —$C_2F_5$, —$C_3F_7$, $ClCF_2CF(CF_3)$—, $CF_3CFClCF_2$—, $ClCF_2CF_2$— and $ClCF_2$—.
2. Composition as claimed in claim 1, wherein in said polymeric compound having formula (I) $R_f$ and $R_{f'}$ are represented by T—O(CF$_2$CF(CF$_3$)O)$_a$(CFXO)$_b$— in which: X and T are as defined in claim 1, a and b are numbers such that the molecular weight is comprised in the range interval defined in claim 1 and the ratio a/b is ranging from 10 to 100.

3. Composition as claimed in claim 1, wherein in said polymeric compound having formula (I) R$_f$ and R$_{f'}$ are represented by T—O(CF$_2$CF$_2$O)$_c$(CF$_2$O)$_d$(CF$_2$(CF$_2$)$_z$CF$_2$O)$_h$— in which: c, d and h are numbers such that the molecular weight is comprised in the range defined in claim 1, the ratio c/d is ranging from 0.1 to 10, the ratio h/(c+d) is ranging from 0 to 0.05 and z and T are as claimed in claim 1.

4. Composition as claimed in claim 1, wherein in said polymeric compound having formula (I) R$_f$ and R$_{f'}$ are represented by T—O(CF$_2$CF(CF$_3$)O)$_e$(CF$_2$CF$_2$O)$_f$(CFXO)$_g$— in which: X and T are as defined in claim 1; e, f, g are numbers such that the molecular weight is comprised in the range defined in claim 1; the ratio e/(f+g) is ranging from 0.1 to 10 and the ratio f/g is ranging from 2 to 10.

5. Composition as claimed in claim 1, wherein in said polymeric compound having formula (I) R$_f$ and R$_{f'}$ are represented by T—O(CF$_2$O)$_j$(CF$_2$CF(OR$_{f''}$)O)$_k$(CF(OR$_{f''}$)O)$_l$— in which: R$_{f''}$ is selected from —CF$_3$, —C$_2$F$_5$, —C$_3$F$_7$; j, k, l are numbers such that the molecular weight is comprised in the range defined in claim 1; k+l and j+k+l are at least equal to 2, the ratio k/(j+l) is ranging from 0.01 to 1000, the ratio l/j is ranging from 0.01 to 100 and T is as defined in claim 1.

6. Composition as claimed in claim 1, wherein in said polymeric compound having formula (I) R$_f$ and R$_{f'}$ are represented by T—O—(CF$_2$(CF$_2$)$_z$CF$_2$O)$_s$— in which s is such a number to give the molecular weight defined in claim 1, and z and T are as defined in claim 1.

7. Composition as claimed in claim 1, wherein in said polymeric compound having formula (I) R$_f$ and R$_{f'}$ are represented by T—O(CR$_4$R$_5$CF$_2$CF$_2$O)$_{j'}$— in which R4 and R5, equal or different, are selected from H, Cl and perfluoroalkyl with 1–4 C atoms, j' is such a number to give the molecular weight defined in claim 1 and T is as defined in claim 1.

8. Composition as claimed in claim 1, wherein in said polymeric compound having formula (I) R$_f$ and R$_{f'}$ are represented by T—O(CF(CF$_3$)CF$_2$O)$_{j''}$— in which j" is such a number to give the molecular weight defined in claim 1 and T is as defined in claim 1.

9. Composition as claimed in claim 1, wherein in said polymeric compound having formula (I) R$_f$ and R$_{f'}$ are represented by R$_{f'}$—O—(CF(CF$_3$)CF$_2$O)$_a$(CF$_2$O)$_b$ in which a and b are numbers such that the molecular weight is comprised in the range defined in claim 1, the ratio a/b is ranging from 20 to 40 and R$_{f'}$ is as defined in claim 1.

10. Composition as claimed in claim 1, wherein in said polymeric compound having formula (I) R$_f$ and R$_{f'}$ are represented by ClC$_3$F$_6$O(CF(CF$_3$)CF$_2$O)$_a$(CF$_2$O)$_b$ in which a and b are numbers such that the molecular weight is comprised in the range defined in claim 1 and the ratio a/b is ranging from 20 to 40.

11. Composition as claimed in claim 1, wherein said fluoropolymers belonging to the fluoroelastomers class consist of copolymers of vinylidene fluoride and of hexafluoropropene optionally containing one or more comonomers selected from the group consisting of tetrafluoroethylene, the perfluoro(alkylvinylethers), 1-hydropentafluoroethylene, chlorotrifluoroethylene and the olefins having to 4 carbon atoms.

12. Composition as claimed in claim 1, wherein said fluoropolymers are in the form of an aqueous dispersion of colloidal particles having a size lower than 1 micrometer.

13. Composition as claimed in claim 1, wherein it contains pigments and dispersants and anti-foam substances in amounts ranging from 20 to 40% by weight with respect to said fluoropolymer.

14. Composition as claimed in claim 1, wherein it contains said thickening additive of formula in (I) in amounts ranging from 0.02 to 0.3% by weight.

15. Composition as claimed in claim 1, wherein n of formula (I) is a number ranging from 8 to 30.

16. Composition as claimed in claim 1, wherein R$_f$ and R$_{f'}$ of formula (I) are perfluoropolyether radicals having a number average molecular weight ranging from 400 to 1000.

* * * * *